(12) United States Patent
Noden (10) Patent No.: US 7,191,452 B2
(45) Date of Patent: Mar. 13, 2007

(54) METHOD FOR CREATING APPLICATION PROGRAMMING INTERFACES FOR INTERNAL APPLICATIONS

(75) Inventor: John Noden, Southampton (GB)

(73) Assignee: Convergys CMG Utah, Salt Lake City, UT (US)

( * ) Notice: Subject to any disclaimer, the term of this patent is extended or adjusted under 35 U.S.C. 154(b) by 331 days.

(21) Appl. No.: 10/184,381

(22) Filed: Jun. 27, 2002

(65) Prior Publication Data

US 2003/0033446 A1    Feb. 13, 2003

Related U.S. Application Data

(60) Provisional application No. 60/302,228, filed on Jun. 29, 2001.

(51) Int. Cl.
G06F 3/00    (2006.01)
G06F 9/44    (2006.01)
G06F 9/46    (2006.01)
G06F 13/00   (2006.01)

(52) U.S. Cl. ............... 719/328; 719/311; 719/330; 717/114; 717/115

(58) Field of Classification Search ............... 719/328, 719/311, 330; 717/114–115
See application file for complete search history.

(56) References Cited

U.S. PATENT DOCUMENTS 5,815,703 A    9/1998   Copeland et al. .......... 395/613
5,966,531 A    10/1999  Skeen et al. ............... 395/683
6,115,744 A    9/2000   Robins et al. ............. 709/227
6,230,117 B1   5/2001   Lymer et al. .............. 703/22
6,256,676 B1   7/2001   Taylor et al. ............. 709/246
6,854,120 B1*  2/2005   Lo et al. ................... 719/311

OTHER PUBLICATIONS

Baker, Henry G., "Inlining Semantic for Subroutines which are Recursive," Dec. 1992, ACM, pp. 39-46.*
*IBM Distributed Search Technology*; Bart Emanuel; (Publication date unknown, 37 pgs.).
*Integragte*; WRQ Enterprise Integration for ERP, CRM, database, mainframe and other legacy applications; http://www.wrq.com/news/whitepap/0717.html; date visited Nov. 13, 2001 (30 pgs.).
*Interface Definition Language (IDL)*; http://www.cs.umbc.edu/~thurston (*various pages*) (date visited —Aug. 3, 2001) (19 pgs.).
*Understanding Interface Definition Language: A Developer's Survival Guide*; Bill Hludzinski; http://www.microsoft.com/msi/0898/idl/idl.htm: ©Aug. 1998 (16 pgs.).
*The Interface Definition Language*; Victor Markowitz; http://gizmo.lbl.gov/DM_TOOLS/OPM/OPM_EN/; ©Sep. 20, 1996 (various pages—8 pgs.).
*Interface Definition Language*, http://accl.lerc.nasa.gov/IPG/CORBA/corba-fortran_v3; date visited Aug. 3, 2001 (4 pgs.).

(Continued)

*Primary Examiner*—William Thomson
*Assistant Examiner*—Qing-Yuan Wu
(74) *Attorney, Agent, or Firm*—Frost Brown Todd LLC (57) ABSTRACT

This application discloses a engine for creating intermediate application programming interfaces by utilizing an target application's closed application programming interface through a macro coded in a specially designed macro language.

7 Claims, 6 Drawing Sheets

OTHER PUBLICATIONS

*Getting Started with Java IDL: Writing the Interface Definition*; http://java.sun.com/j2se/1.4/docs/guide/idl/tutorial/GSIDL.html; Sun Microsystems, Inc. date visited —Aug. 3, 2001 (6 pgs.).

*API Gateway Guide 5.5*; http://novell.curtin.edu.au/grpwise.ADMIN/api00001.htm; date visited—Aug. 1, 2001 (3 pgs.).

*IJONET—CGI (Common Gateway Interface Explained; IJONET Innovations* http://www.ijonet.com/Main/Technology/CGI; ©1999 (3 pgs.).

*Just DOT I.T.—Jaffa*; Just Dot I.T. Pty. Ltd.; http://www.justdotit.com.au/jaffa/jaffa_bottom.htm; ©2000 (5 pgs).

*Sample Oracle Office API Program*; Oracle Corporation; http://technet.oracle.com/support bboard/content/596.htm; ©1998 (3 pgs.).

*O'Reilly Network: Meerkat: An Open Service API*; O'Reilly Associates; http:/www.oreillynet.com/pub/a/rss/2000/05/09/meerkat_api.hrml; ©May 9, 2000 (3 pgs.).

*DB2 OLAP Server: Building A Simple API Program*; http://www-4ibm.com/software/data/db2/db2olap/docs/V71docs/api/samptutr.htm; date visited Aug. 1, 2001 (26 pgs.).

*Application Programming Interface/Computerworld News & Feature Story*; http://www.computerworld.com/cwi/story; © Jan. 10, 2000 (4 pgs.).

*API Application Programming Interface; Focus on Linux*; http://linux.about.com/library/glossary/bdlef_api.htm; (date visited —Aug. 8, 2001) (1 pg.).

*The OMG*; Christophe Warland; http://www.bejug.org/new/pages/articles/corba; ©May 1997 (32 pgs.).

*Borland Database Engine 2.0 for Windows*; http://www.tietovayla.fi/BORLAND/BDE/engine.htm; ©Mar. 24, 1995 (10 pgs.).

*API—Webopedia Definition and Links*; http://www.webopedia.com.TERM/A/API.html; date visited —Aug. 1, 2001 (1 pg.).

*WinPlanet—Reviews—Wrox Press 32 API Tutorial—The Beginning*; http://www.winplanet.com/winplanet/reviews/673/2; (date visited —Aug. 1, 2001 (2 pgs.).

*Application Programming Interface*; David Steere; http://www.cse.ogi.edu/~dcs/papers/sosp16/sosp/node8.html: ©Jul. 24, 1997 (4 pgs.).

*Gateway Application Programming Interface*; http://www.google.com/search+interface; date visited —Aug. 1, 2001 (4 pgs.).

*ZDNet:developer: What is CGI: The ABC's of CGI: Common Gateway Interface*; http://icq.zdnet.com/devhead/stories/articles: date visited Aug. 1, 2001, (2 pgs.).

*Overriding API Definitions*; http://www.pbdr.com/pbtips/ap/override.htm; last updated Mar. 4, 2000 (1 pg.).

*WebServer Compare Descriptions: API*; http://webcompare.iworld.com/desc/api-desc.html; date visited Aug. 1, 2001. (1 pg.).

*Application Programming Interface API*; http://www.freesoft.org/CIE/Topics/3.htm; date visited —Aug. 1, 2001 (4 pgs.).

*Application Programming Interface API*; http://www.firbeck.com/help/api.htm; date visited —Aug. 1, 2001 (1 pg.).

CORBA Objects; http://www.dcs.port.ac.uk; date visited —Aug. 3, 2001 (2 pgs.).

CORBA FAQ—Basics; http://www.omg.org/getting started/corbafaq.htm; date visited Aug. 23, 2001; 1 pg.

*"Yesterday API was just another acronym; today I have to document one!"*; Susan W. Gallagher; http://pw1.netcome.com/~gscale/susanwg/cmindware/api.htm; ©1999 (10 pgs.).

*XML:DB Database API Introduction*; http://www.xmldb.org/xapi/xapi-draft.html; ©2000-2001 (5 pgs.).

*pulver.com IP Telephony Resource*; http://www.pulver.com/gateway; ©1998 (9 pgs.).

*Standard Satellite Control Segment Reference Architecture*; The Aerospace Corporation; http://sunset.usc.edu/research/reference_architecture/toc_main.html; ©1996 (9 pgs.).

*Interface-parasite Gateways*; Robert A. Barta, et al., http://www.infosys.tuwien.ac.at/Staff/pooh/papers/BIBOS; ©Dec. 11-14, 1995 (17 pgs.).

*Gateway* from FOLDOC; http://foldoc.doc.ic.ac.uk/foldoc/foldoc.cgi?gateway; date visited Aug. 1, 2001 (1 pg.).

\* cited by examiner

METHOD FOR CREATING APPLICATION PROGRAMMING INTERFACES FOR INTERNAL APPLICATIONS

This non-provisional patent application claims priority from U.S. provisional application No. 60/302,228 which was filed on Jun. 29, 2001.

FIELD OF INVENTION

This invention is in the field of the development of application programming interfaces for internal applications.

BACKGROUND

Customers are increasingly requesting the capability to initiate and control internal applications, in particular order entry, scheduling and customer care functionality, via a functionally rich set of API's (Application Programming Interfaces). An application program interface is the specific method prescribed by a computer operating system or by an application program by which a programmer writing an application program can make requests of the operating system or another application.

The clients wish to be able to integrate long-standing internal applications with other third party products that either provide functionality not provided by the internal application or provide functionality in a more flexible way than similar functionality included in the internal application.

Other important requirements include the ability to scale up to a high volume of transactions in a controlled way and for the API access method to use emerging industry standards, specifically XML.

Internal applications today do offer some API capability. Certain internal application functions can be initiated and controlled using well-defined programmatic interfaces, but these interfaces are constrained in the amount of access that is offered to the rich functionality inherent in the internal application.

If a customer writes their own APIs, this constitutes an unsupported way of using an internal application and has the potential to compromise the integrity of the internal application's database. Additionally, these API's generally mirror closely existing internal application screen functions, providing access to full internal application functionality and obeying the same validation rules as terminal input. Because of the close coupling to internal application screens, in order to achieve a particular function, e.g. to enter a telephony order, several APIs need to be invoked in the correct sequence—this is known as a 'stateful' interface. Also because of the close coupling with internal application screen functions, these API's have very large parameter sets which are liable to change with each internal application release so there is a continuing maintenance load for any programs that use these API's. Finally, certain applications comprise non-reentrant code which poses problems in a multi-user environment.

Therefore, a method and system is required for opening heretofore closed interfaces, allowing external customers to define the functionality exposed through an application's internal/native API, providing a method for developing such exposed functionality in a stateless manner, and providing a bridge to convert non-re-entrant code into re-entrant code.

SUMMARY OF THE INVENTION

In one embodiment, the invention comprises a method for developing intermediate application programming interfaces for applications, comprising the steps of constructing a macro comprising at least one application programming interface call to another program wherein said macro is written in a predetermined macro language; utilizing said macro in a client application; utilizing a gateway further comprising a macro engine wherein said macro engine has been designed to translate and execute said macro; sending said at least one application programming interface call contained in said macro to a separate processor for processing; and returning a value from said sending step to said macro engine to said client application.

In another embodiment, the macro comprises one or more subordinate inline and outline macros.

In another embodiment, the invention's macro engine maintains a pool of processors for processing said at least one application programming interface call.

In another embodiment, the method's macros are stateless.

In another embodiment, the method's macro engine hierarchically processes said at least one application programming interface call.

In another embodiment, the method further comprises the use of a platform and language independent macro engine.

In another embodiment, the invention comprises a system for developing intermediate application programming interfaces for applications comprising a processor configured to act as a dispatcher and a processor configured to act as an engine. The dispatcher receives an intermediate application programming interface request and directs said intermediate application programming interface request to said engine wherein an engine is pre-configured to process said intermediate application programming interface request for a predetermined application. The engine allocates a thread (engine thread) to process said application programming interface request and to create an application programming interface descriptor wherein said descriptor comprises a release descriptor, a macro descriptor, and a field descriptor; said engine thread matches said application programming interface request to a macro via said release descriptor, macro descriptor, and field descriptor wherein said macro is coded using a predefined macro language; said engine thread prepares a set of commands associated with said macro and passes at least one command from said set of commands to a separate process; and said process executes said at least one command. Results associated with said at least one command are passed back to said thread; and said engine prepares a response to said application programming interface request, based on said results, and returns said response to said dispatcher.

In another embodiment, the system's engine thread hierarchically processes said set of commands according to a set of instructions contained in said macro.

In another embodiment, the system's macro language comprises one or more constructs selected from a group of constructs including macro, define, declare, execute, traverse, if/else/endif, commit, for/until/while, endloop, onerror, label, abort, exit, retry, resume, and rollback.

In another embodiment, the system's engine is language and platform independent.

In another embodiment, the invention comprises a system for developing intermediate application programming interfaces for applications comprising a dispatcher and an engine wherein said dispatcher receives an intermediate application programming interface request; if said engine is not available, said dispatcher queues said intermediary application programming interface request until said engine is available; when said engine is available, said dispatcher directs said intermediary application programming interface request to said engine wherein said engine is pre-configured to process said intermediary application programming interface request for a predetermined application; said engine allocates a thread to process said application programming interface request and to create an application programming interface descriptor wherein said descriptor comprises at least one release descriptor, at least one macro descriptor, and at least one field descriptor; wherein said release descriptor is associated with at least one of said macro descriptor, and further wherein said macro descriptor is associated with at least one of said field descriptor; said thread hierarchically processes a plurality of macros derived by matching said release descriptors and said macro descriptors with at least one macro and performing the following steps:

- if a set of variables from a field descriptor associated with the release descriptor and the macro descriptor of said macro is available, said thread hierarchically prepares a series of commands associated with said macro by associating a set of variables described in said field descriptor associated with said release descriptor and said macro descriptor for said macro (associated variables);
- if a set of variables from a field descriptor associated with the release descriptor and the macro descriptor of said macro is not available, said thread hierarchically transcends said set of macro descriptors until it finds a set of variables that may be associated with said command (associated variables);
- said thread passes said command and associated variables to a separate process;
- said process executes said command;
- a set of results associated with said command are passed back to said thread;
- said thread associates said results with said macro; and said engine prepares a response to said application programming interface request and returns said response to said dispatcher.

In another embodiment, the system's macro language comprises one or more constructs selected from a group of constructs including macro, define, declare, execute, traverse, if/else/endif, commit, for/until/while, endloop, onerror, label, abort, exit, retry, resume, and rollback.

In another embodiment, the system's engine is language and platform independent.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE PREFERRED EMBODIMENT

Various embodiments of the invention, disclosed herein, address a need to provide a robust engine for the development of application programming interfaces (API) for internal and/or closed applications. They answer a need to create a set of external API's for internal applications that are consistent in relation to method of access; message syntax; operational procedures; performance; security; and error logging.

Various existing applications have long had their own internal APIs with a great deal of functionality. It is, however, unwise to expose these internal APIs to external customers because, if handled incorrectly, damage could be inflicted on databases associated with these internal applications. Furthermore, external customers are also interested in having access to APIs using the latest industry standards, e.g. XML, and/or using the latest programming languages, e.g. Java. It is not time/resource efficient, however, to recode internal APIs to meet these needs.

An API created and executed, according to the method disclosed herein, can be designed at a high level to provide a complete aggregate function that is self-contained (a 'stateless' API). This is particularly important when designing APIs for access via the Internet or the web as it allows better control of resource usage and scalability on the particular platform used. It provides an externalized programmatic interface to an internal application's core functionality in a controlled way that can be extended without any change to core, internal application code. This also solves the problem that the internal APIs were built for internal calls and not external ones and therefore are often not 'normalised'. The API Gateway rearranges its normalised API call into a series of non-normalised calls. Normalised in this context means that the API represents a useful expected process (normally a discreet business process). The non-normalised API often represents a partial function which, typically, holds state from one call to another. An analogy of this could be drawn from a car. The driver expects the accelerator pedal to be in a given place and to perform in a certain way—this is normalised. An object representing the mechanical or electronic linkage to the fuel system and its relationship to the carburetor etc. would be non-normalised.

Furthermore, an external API created according to the method disclosed herein allows the client application to take advantage of the latest industry standards, i.e., XML, TCP/IP, HTTP. The client application is the application seeking to utilize the functionality of another application (the target application). The existing, closed application does not require recoding and the business rules enforced by the existing application remain in effect. This enables the existing application to participate readily as a 'component' in an integrated 'best-of-breed' component-based solution, which is the emerging industry architecture for business application systems. The method and system disclosed herein presents a way to create and utilize an intermediate interface to the internal and/or closed API. The method and system of the intermediate API sits between the client application and the closed/internal application.

Another problem in the art is that closed applications are often written in a non-re-entrant manner. Reentrant is an adjective that describes a computer program or routine that is written so that the same copy in memory can be shared by multiple users. Reentrant code is commonly required in operating systems and in applications intended to be shared in multi-use systems. A programmer writes a reentrant program by making sure that no instructions modify the contents of variable values in other instructions within the program. Each time the program is entered for a user, a data area is obtained in which to keep all the variable values for that user. The data area is in another part of memory from the program itself. When the program is interrupted to give another user a turn to use the program, information about the data area associated with that user is saved. When the interrupted user of the program is once again given control of the program, information in the saved data area is recovered and the program can be reentered without concern that the previous user has changed some instruction within the program. An embodiment of the system and method, therefore, provides a way to allow multiple calls to non-re-entrant programs. Although these programs are non-reentrant they need (for the purposes of this system) to be serially reusable. By maintaining a process-pool of these programs the gateway can service many concurrent requests by spreading the load over this process-pool and mimic the functionality of re-entrant code. External customers may utilize macros through a gateway comprising a dispatcher and an engine. The control of the gateway is done via the dispatcher. A gateway is a network point that acts as an entrance to another network. The dispatcher may have operating system dependencies (the gateway code should be pure). The dispatcher is responsible for maintaining a pool of gateways. When a request comes in for a particular API the gateway searches for a free gateway supporting that particular version of an API. If is does not find a free one and the pool parameters indicate that further gateways may be loaded then the dispatcher loads a gateway and has it load the appropriate FAD(s). Should the pool of a particular gateway be exhausted then the dispatcher will either queue the request until a free gateway is found or reject the request as busy. On allocating a particular request to a given gateway the dispatcher will mark the gateway as busy. Once the gateway has finished the request then it signals the dispatcher that it is again free.

An external customer may specify the functionality they wish to access via the target/internal application through an API request. The external customer further specifies a language for submitting these API requests (i.e., XML). In this way, the customer may use whatever environment it prefers. A manager/programmer for the target application uses a specially designed macro language to create a macro which achieves the specified functionality using the functions exposed by the target/internal application's native API. In computers, a macro (for "large"; the opposite of "micro") is any programming or user interface that, when used, expands into something larger. The original use for "macro" or "macro definition" was in computer assembler language before higher-level, easier-to-code languages became more common. In assembler language, a macro definition defines how to expand a single language statement or computer instruction into a number of instructions. The macro statement contains the name of the macro definition and usually some variable parameter information. Macros are useful especially when a sequence of instructions is used a number of times (and possibly by different programmers working on a project). Some pre-compilers also use the macro concept.

Macros may be as simple or complex (nested) as needed depending on the functionality desired by the external customer. The predefined macro language may include constructs such as Macro, Define, Declare, Execute, Traverse, If/Else/Endif, Commit, For/Until/While/EndLoop, OnError, Label, Abort, Exit, Retry, Resume, Rollback. The predefined macro language allows the macro processor to interpret the API requests without being dependent on a specific on the language or platform of the client or target (closed/internal) program.

Once the desired macros are created, the external customer may utilize the macros in client application(s) and thereby take advantage of the functionality offered by the target application(s). The dispatcher fields new API requests from the network (i.e., via a TCP/IP socket) and may perform some initial validation on the message and extracts environment information from the message to determine which internal application instance this particular API request is intended for (since there may be several independent internal application databases resident on the same platform). The message is then queued for execution by a free API engine that may be configured for that particular internal application instance. API engines are configured in a pool whose size and environment requirements are determined by setup parameters. This allows control over resource allocations based on expected demand for particular types of service and on the response times required. In computer programming, engine is a jargon term for a program that performs a core or essential function for other programs. An engine can be a central or focal program in an operating system, subsytem, or application program that coordinates the overall operation of other programs.

Figure 1:
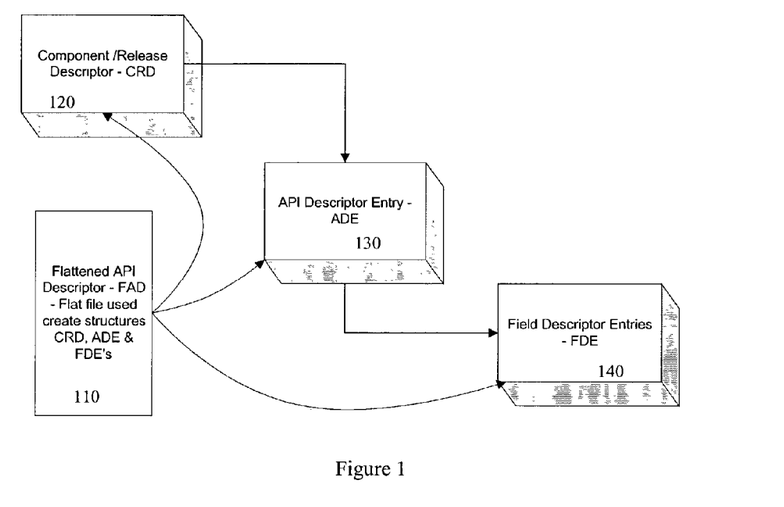
FIG. 1 is a breakdown of an API definition.

Referring to FIG. 1, macros may be processed through a gateway designed to receive macro requests/calls. The gateway maintains a file, i.e. a flat file, which matches the external API requests to their respective macros. This file may be known as the Flattened API Descriptor (FAD) (110). The FAD (110) comprises all the possible commands understood by the Gateway and their associated macros. The FAD (110) may further comprise a group of descriptors: a component/release descriptor (CRD) (120), an API descriptor entry (ADE) (130), and a field descriptor entry (FDE) (140). The CRD (120) matches the API request with the correct application and version thereof, the ADE (130) matches the name of the API request with the correct macro, and the FDE (140) specifies the inputs and outputs for that macro. For instance, the Gateway's engine may receive a macro call from an XML program to, "Add Customer for Application 4.7." The Gateway checks the CRD (120) for Application 4.7, it then accesses the "Add Customer" descriptor in the ADE (130) to obtain the actual macro, and then it accesses the inputs and outputs stored in the FDE (140).

Internally each product may be represented by a series of linked lists (the FAD) (110). These lists are either loaded at start-up time or via API calls. Referring to FIG. 1, at the head of these linked lists is the component/release descriptor (CRD) (120). These point to the API descriptor entries (ADE) (130) which in turn point to the field descriptor entries (FDE) (140).

Figure 2:
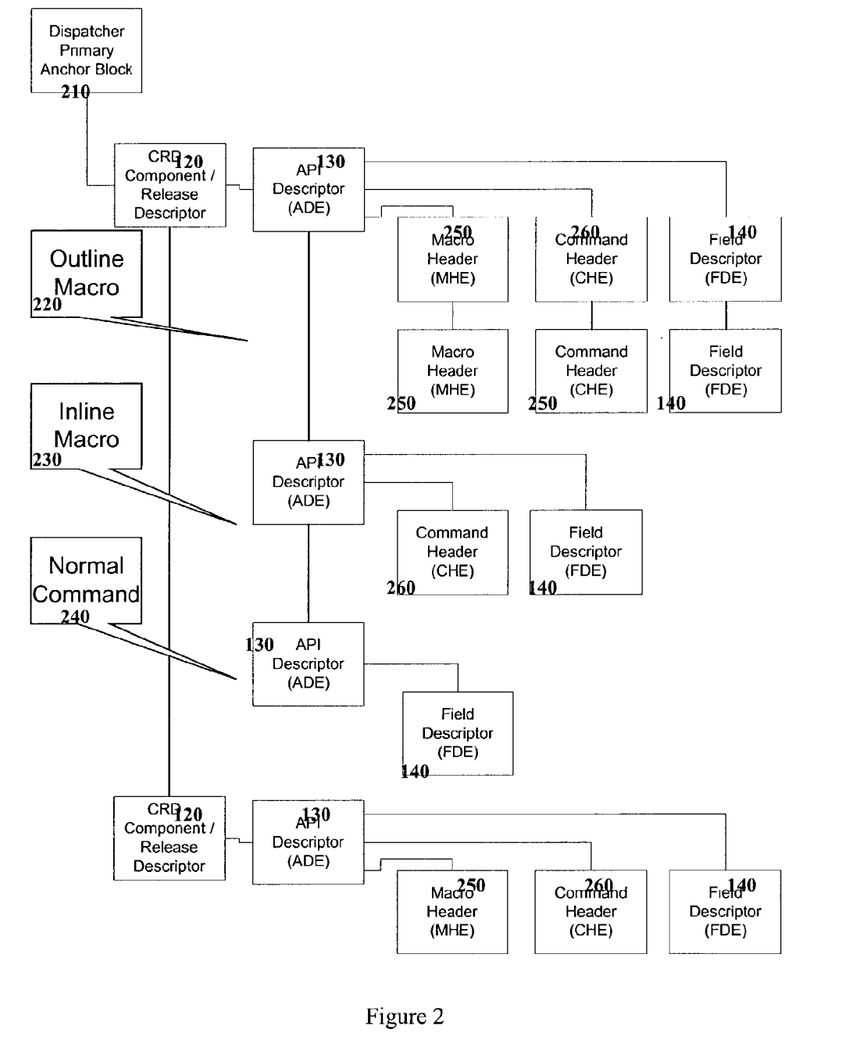
FIG. 2 is a diagram showing a set of control blocks that could describe an outline, inline and a normal command.

Referring to FIG. 2, the Flattened API Descriptor (FAD) (110) File contains entries from which the gateway routines may build the CRD (120), ADE (130), MHE (250), CHE (260) and FDE (140) tables. As part of this process various stubs and copy-books are created; these could include RPG stubs, C header files, VB and Java calling routines. An API definition may identify the mandatory interfaces between system components and provide detailed characteristics about the required communication. A complete API definition for a given application may provide all information needed by a separate application to interface to it, i.e., how initiation/termination are performed, what interface protocol is used, what information is sent/received, timing requirements, and other attributes.

The macro(s) are processed/executed through a compiler, which may be developed using widely available language processing tools (LEX, YACC), which originated with the UNIX system from Bell Labs, which are now in the public domain. The compiler may be designed to process the particular language along with the syntax rules that make up the macro language. The macro language is key to how an external API is translated into functions that apply to a particular application. Through a series of instructions comprising one or more macro constructs utilizing internal API calls, SQL statements, and conventional language constructs (i.e., string processing features), the external API macro may be executed against the internal/closed application. By using a predefined macro language to create the intermediate interface to the target/internal/closed application, this method/system achieves platform independence because it is not necessary to code platform/language specific intermediaries between the client application and the target application.

In one embodiment, the gateway comprises a dispatcher and an API engine running under one multi-threaded process job). In computer programming, a thread is placeholder information associated with a single use of a program that can handle multiple concurrent users. From the program's point-of-view, a thread is the information needed to serve one individual user or a particular service request. If multiple users are using the program or concurrent requests from other programs occur, a thread is created and maintained for each of them. The thread allows a program to know which user is being served as the program alternately gets re-entered on behalf of different users. (One way thread information is kept by storing it in a special data area and putting the address of that data area in a register. The operating system always saves the contents of the register when the program is interrupted and restores it when it gives the program control again.)

In another embodiment, the gateway comprises a dispatcher and an API engine comprising a pool of API processors each running in a separate processes jobs).

In certain computer operating systems, a job is the unit of work that a computer operator (or a program called a job scheduler) gives to the operating system. For example, a job could be the running of an application program such as a weekly payroll program. A job is usually said to be run in batch (rather than interactive) mode. The operator or job scheduler gives the operating system a "batch" of jobs to do (payroll, cost analysis, employee file updating, and so forth) and these are performed in the background when time-sensitive interactive work is not being done. In IBM mainframe operating systems (MVS, OS/390, and successors) a job is described with job control language (JCL). Jobs are broken down into job steps. An example of a job step might be to make sure that a particular data set or database needed in the job is made accessible.

The dispatcher may maintain a pool of API engines to facilitate the efficient processing of incoming API requests (possibly received over a network). The engines may even be configured to handle certain API requests according to the expected demand for particular types of service and response times required. The commands which make up the macro are atomized into a logical tree structure. The macro may then be executed against the internal API using a stub. A stub is a small program routine that substitutes for a longer program. The API stub represents the hook that links the macro to the external program. It is also possible that a macro command may directly interact with the database for a particular product (i.e., an SQL query). A response is built for the API request by analyzing/combining the results from various instructions. The response is then also atomized onto the logical tree structure. The response is then returned to the dispatcher and back to client application.

A particular macro may relate to a particular internal application or class of applications (i.e., billing applications) but the technique and the macro language are generic. Thus it is possible that a macro may be coded to serve multiple applications.

The method and system may also be used to support non-re-entrant (but re-usable) code within one environment (i.e., IBM environment) while still maintaining efficiency in another environment (i.e., the UNIX or Windows NT environments). Specifically, the macros are processed within an API engine thread when an external API request is encountered. The macro processor marshals the command and associated variables into a command string and passes it over to a separate API Processor process (from a pool of such processes) (as opposed to processing the request on the main thread) to be processed. Once the command is complete the results are once again marshalled and passed back to the API engine thread within the main process. The API engine thread atomises the marshalled data back over the hierarchical data structure. By maintaining separate API Processors, this method allows each internal/closed function call to have its own area thus converting non-re-entrant code into re-entrant code.

The method and system may utilize a hierarchical method to maintain variable/parameter data. This allows any macro to employ the object-oriented concept of inheritance. The variables and parameters are kept in a hierarchical structure. The macros themselves appear in a hierarchical format. Each separate macro/sub-macro appears as a node (ADE) (130) within the hierarchical structure and each node may contain a set of variables and parameters. As any given macro is processed, it gets and sets variables. If a given variable is available from the set of variables attached to its own node (ADE) (130) then it will use the local variable. However, if the variable does not exist then it will hierarchically ascend the ADE (130) tree structure until it either finds the variable or it exhausts the tree. This means that from any given node its children inherit the variable data unless the children define a local variable with the same name (in-line inheritance) Should the macro programmer wish to break this inheritance then the macro definition at that particular node is set as 'outline'. This ADE (130) is mirrored to a new ADE (130) tree structure. Child macros of this outline macro are atomised over this isolated ADE (130) tree structure. Parameters associated with this outline macro are resolved using the inline inheritance rules and the results mirrored onto the isolated ADE (130) tree.

Figure 4:
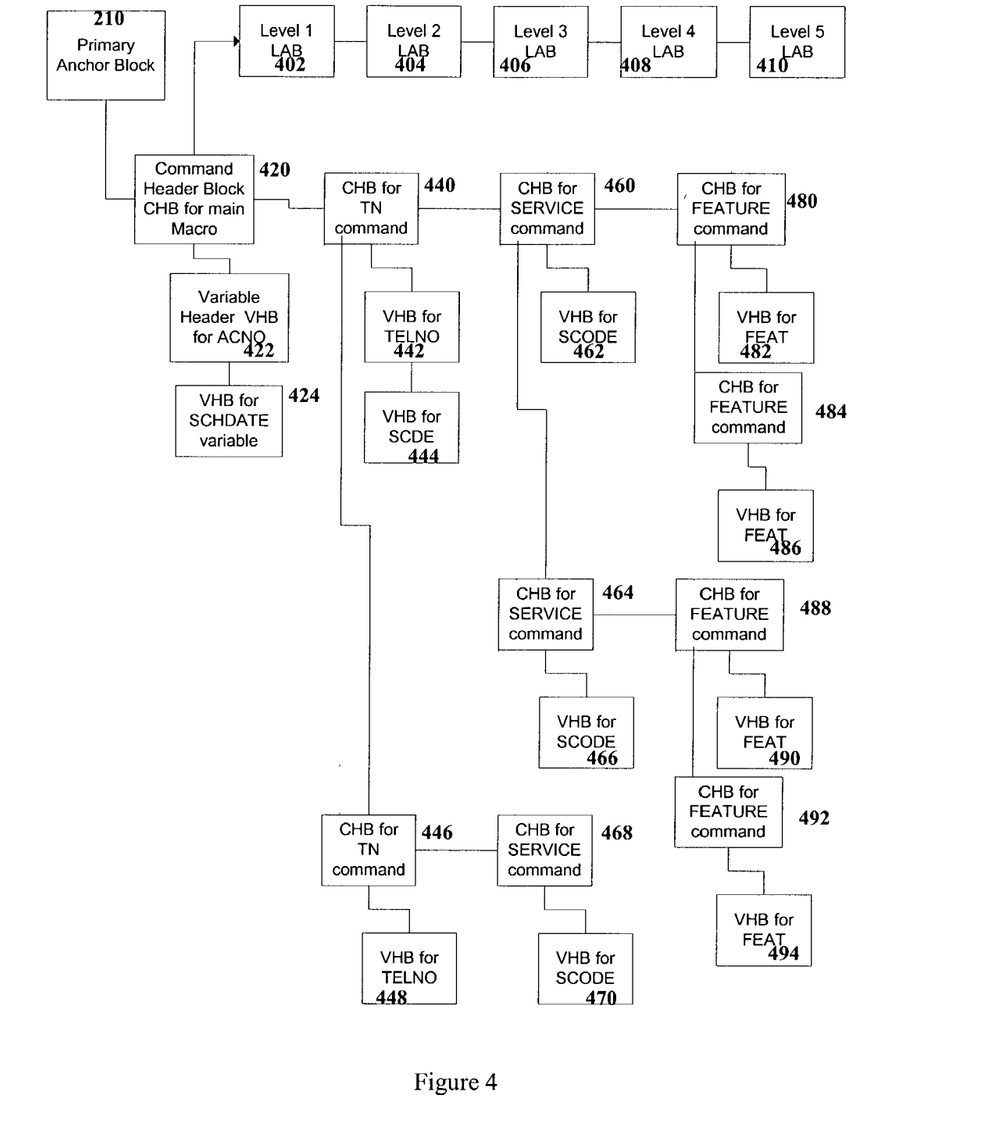
FIG. 4 illustrates the parsing of the input data stream into various macro structures.

The execution of the macros may be accomplished through the TRAVERSE instruction. The traverse instruction allows the macro to execute all or part of the ADE (130) tree in a hierarchical fashion. The hierarchical ADE (130) is divided into horizontal bands. Referring to FIG. 4, each band is anchored to the 'level anchor block (LAB)'. In the simplest form the traverse instruction allows the programmer to select a 'from' level and a 'to' level. This will cause the macro processor to execute all of its progeny at the selected 'from' level traversing through to the 'to' level. A modifier to the traverse instruction allows the programmer to select the 'from' and the 'to' levels, except instead of selecting its progeny it executes all macros between the levels. A further flag is available that modifies the previous two traverse scenarios by filtering on macro names, i.e. only executing the macros that pass a wild-card filter.

Figure 3:
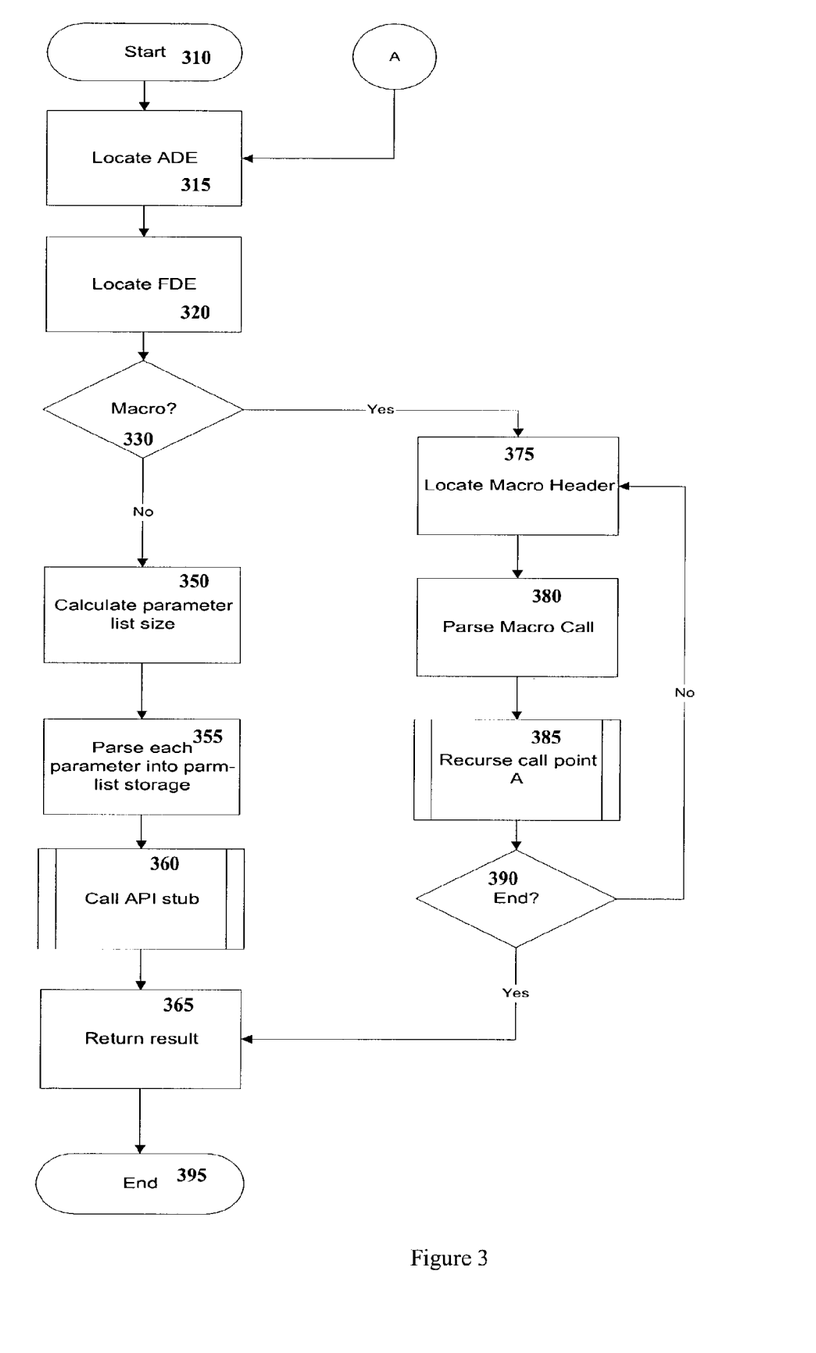
FIG. 3 is a process flow outline.

Referring to FIGS. 2 and 3, in one embodiment the parser may take a stream (pipe) input and use the FAD to process each of macros. Variables associated with the macro may be packaged and the parser may be recursively recalled to process the data. Nested macros may be allowed and may be processed by again recalling the parser. The parser may pass the data stream and create a tree structure of linked lists associating variables with their respective commands. The levels of the nodes of this process are controlled by adeLEVEL. When a macro is encountered then a new stream is created by delimiting what appears between nested parenthesis. Once all commands and parameters are atomised onto the tree structure then the commands are called in order with their associated variables. Return data is also atomised onto the tree structure. Once complete, the output data is gathered in level order. Output from macros is also gathered but its level is delimited by parenthesis. The effect of this process is to make the output data stream resemble the input data stream but containing output as opposed to input data.

Referring to FIG. 4, the input data stream may be parsed into the structures defined above in one embodiment of the invention. FIG. 4 details the control block structure and linkage for the following command:

CRWO;ACNO;1234567;(TN;TELNO;12345678;SCDE; ZYX(SERVICE;SCDE;ABC (FEATURE;FEAT;CDE) (FEATURE;FEAT;DEF))(SERVICE;SCDE;CBA (FEATURE;FEAT;CDE)(FEATURE;FEAT;DEF)) (TN;TELNO;1235568( SERVICE;SCDE;ABC)) SCHDATE;01012000;

Referring to FIG. 4:
1. The Parser/Primary Anchor Block(PAB) (210) anchors the structure.
2. The CHB (420) for the main macro represents the macro command CRWO.
3. CRWO has 2 variable pairs—ACNO and SCHDATE. ACNO follows CRWO whilst SCHDATE appears at the end of the sequence. We know SCHDATE belongs to the CRWO level because of the parenthesis.
4. The TN command is defined as a level 2 command in the CRWO macro and therefore appears down-node to the CHB (440) for CRWO.
5. The next parenthesis helps to group the SERVICE commands which are at level 3 (460).
6. The next parenthesis helps to group the FEATURE commands which are at level 5 (note there are no level 4 commands in this data stream) (480).
7. Although parenthesis help group different levels the parser will imply grouping when levels change. TN for TELNO 1235568 shows this when the SERVICE command follows TN without parenthesis.

In FIG. 4, the solid lines in this chart represent the tree structure as far the command relationship goes however the macro processor may need to traverse the tree ignoring certain levels. To achieve this, level anchor blocks(LAB) (402, 404, 406, 408, 410) hold the chains of these.

In a preferred embodiment, each instance of the gateway should have its own Primary anchor block to ensure re-entrancy. CHB's and their progeny should be freed at the end of each stateless transaction or on the commit/rollback process of bounded processes. The CRD and progeny should be cleared by command or when the dispatcher is shutdown. Some operating systems by their nature may not be able to handle re-entrancy and therefore may require interlocks to control this. Even in this case the gateway should be re-usable.

The level chains are traversed using CHBNEXTLEV. On the diagram these chains are represented using a broken line.

MACRO PROCESSING

The gateway comprises a macro processor. In one embodiment, an exemplary macro entitled CRWO may be defined as follows:

| Component | INTERNAL APPLICATION4.5 | |
|---|---|---|
| Macro | CRWO | Access=public |

| Parameter | Multiple parameter statements follow | |
|---|---|---|
| Define | TN | 2 Alias=SETSERVICE |
| Define | SERVICE | 3 Alias=SETSERVICE |
| Define | QUANTITY | 4 Alias=SETQUANTITY |
| Define | FEATURE | 5 Alias=SETFEATURE |
| Define | LOCK | 1 |
| Define | CREATEWO | 1 |
| Define | COMMIT | 1 |
| Define | UNLOCK | 1 |
| OnError | Label1 | |
| Execute | LOCK | |
| Execute | CREATEWO | |
| Traverse | Level | 2 |
| | | 4 |
| Execute | COMMIT | |
| Traverse | Level | 5 |
| Execute | UNLOCK | |
| Exit | | |
| Label | Label1 | |
| Rollback | | |
| Execute | UNLOCK | |
| Abort | | |

The defined information maps the data stream input/macro commands to the external (interpreted) command and to its execution level. The input commands should preferably be unique but this is not necessary for the interpreted commands. In one embodiment, if the input data stream or the macro commands refer to a command without a header then the macro processor will return an error.

After the "Defines" the first command is OnError whose parameter dictates the label to jump to when an error occurs.

The execute command tells the macro processor to call a command/macro. The parameters to this command/macro are determined by the structures outlined in the FAD table.

The Traverse commands tell the processor to process the commands linked by the level anchor blocks. In the first instance the system will execute the commands by traversing the tree in the normal way but only between levels 2 and 4. In the example all the TN and SERVICE commands will be issued. The second Traverse command will cause all the feature commands to be issued. A Traverse command within a macro specified within a macro marked with Verify=Yes works in a similar fashion to the normal Traverse however it compares the before and current images prior to updating fields further down the macro. If a Traverse command fails to compare then it raises an error condition.

When a command is issued, the FAD table will indicate what parameters could be set as input parameters. Initially the input parameters will be located using the commands Variable Header Blocks (422, 442, 448, 462, 466, 470, 482, 490, 494). If the parameter does not exist at that level then the superior CHB's VHB is searched. This continues until the variable value is found or the top of the CHB block tree is reached.

On return output variables are atomised over the VHB chain. Returns from embedded macros (macro within a macro) may contain level information. The levels may be delimited using parenthesis. Lower level outputs may be atomised over the appropriate CHB's VHB chain.

Macro Processor Pseudo Code

Main-Code( )
Open input stream

-continued

Macro Processor Pseudo Code

Copy input parameters to buffer
Get CRD table for this component/release
Call Macro-Parser (buffer-pointer main command, 1)
If not error then
    Call Output-Marshall
Else
    Call Error-Output Marshall
End If
Exit Subordinate Macros Subordinate macros are macros that appear within another macro. Subordinate macros are one of two types: inline and standard (otherwise known as outline). When a subordinate macro is encountered (in the command chain or as part of the traverse command) its header information is looked up to find out what variables are to be passed. These variables are collected as per usual i.e. first take the variables that are explicitly defined and then looking up the command hierarchy for other missing variable values. Once found the macro is called and executed. The actual method of execution depends on the macro type.

Outline Macros

Figure 5:
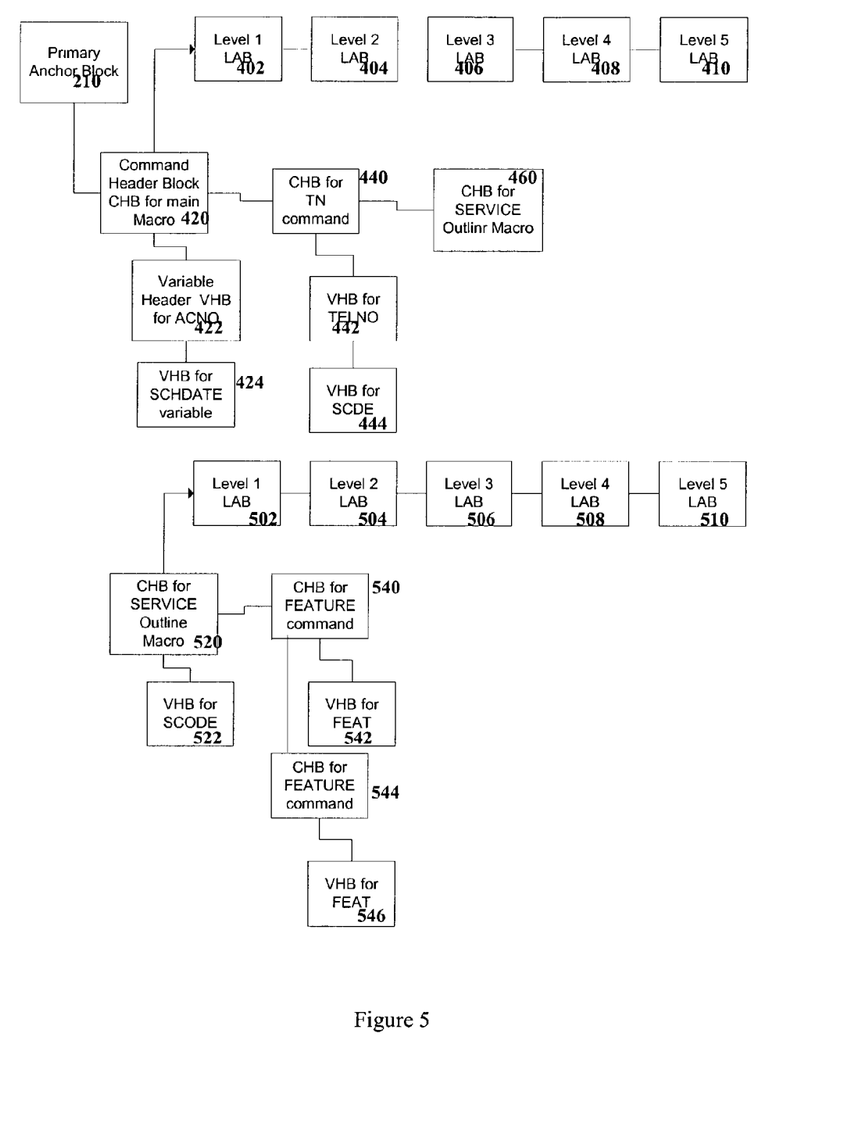
FIG. 5 illustrates the linkage for an outline macro[MT1].

Referring to FIG. 5, outline macros may be executed as if they were isolated from the main macro. In essence the CHB for the macro points to a new command chain with its own head CHB and level chain. Sub-level commands and macros are not created within the original CHB chain but on this new isolated chain. As the macro executes, output variables are added to the isolated chain. Should a sub-level command or macro require a variable not present in the isolated chain then it may fail as it preferably will not look for this variable within the original CHB chain.

Should the sub-level macro itself contain an outline macro then a new isolated chain may be constructed.

Macro-Parser (Buffer-pointer, Command-type, Process-level) * Warning Recursive Process Loop until end-of-buffer
Get next command from buffer
Lookup API descriptor for command
Create CHB for command
If outline macro
    If level-chain already exists then error
    Calculate highest level into a
    Create anchor blocks and enchain them onto the CHB
End if Once all execution is complete the parser builds the return output data by scanning the main CHB chain. If it encounters an outline macro CHB then it links to the appropriate isolated CHB chain and pulls the output variable data from there. Obviously if sub-level outline macros exist within the isolated chain then their isolated chain data may also be pulled in.

Inline Macros

Inline macros are executed as if they were embedded in the main macro itself. The full chain for the macro is held within the main CHB chain (or at the level it was embedded within). Sub-level commands and macros may be created within the original CHB chain. As the macro executes, output variables are added to the caller's CHB chain. Should a sub-level command or macro require a variable not present within the macro's CHB variable chain, it may search for the data within hierarchically superior variable chains.

Level loops within the inline macro will cause complete execution of the level. This is irrespective of level command being part of the inline macro sub-level chain or not. Great care must be taken to ensure that accidental execution of other commands does not occur.

As all the output variables exist within the caller's chain for inline macros the parser simply picks the data from this chain as opposed to an isolated chain.

Figure 6:
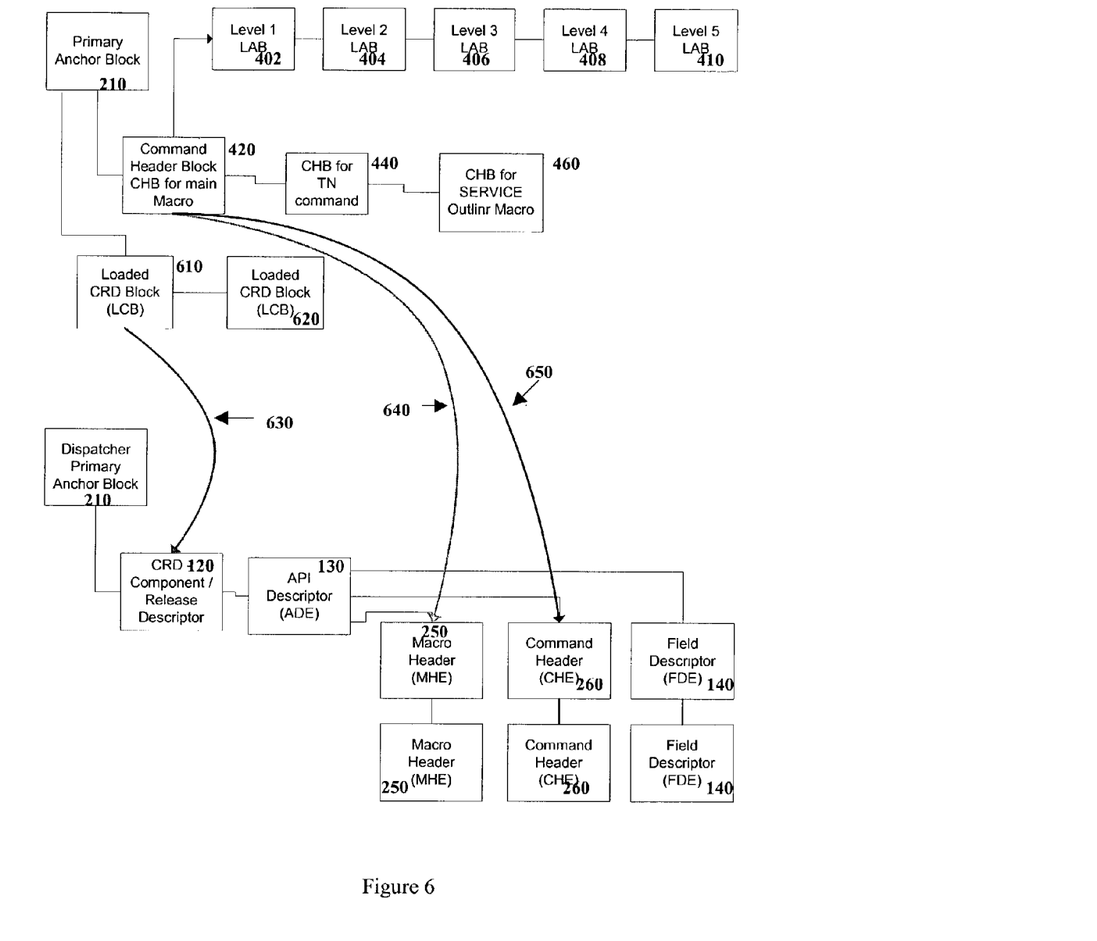
FIG. 6 shows the relationship of some of the major control blocks when a macro is executing.

Referring to FIG. 6, this diagram shows the relationship of some of the major control blocks when a macro is executing. The upper set of blocks is anchored to a particular instantiation of a command. The lower set of blocks is anchored from the dispatcher and represents the static information of macros and commands for all the loaded component API's.

Each LCB points to a shared CRD (represented by the leftmost curved line—630).

The command header block is for an outline macro (all primary commands are outline macros). The CHB (420) points to a chain of macro headers (MHE's) (250) and a chain of command headers (CHE) (260). These are represented by the middle curved line (640) and the rightmost curved line (650).

Macro Processor Language Support

In one embodiment of the invention, the following instructions are supported: Macro, Define, Declare, Execute, Traverse, If/Else/EndIf, Commit, For/Until/While/EndLoop, OnError, Label, Abort, Exit, Retry, Resume, Rollback. The macro processor may be designed to support an infinite variety of commands.

Macro

Macro indicates the start of a new macro. The macro instruction has 2 parameters—the macro name and the component name (e.g. INTERNAL APPLICATION 4.5). End is used to mark the end of the main process or the end of a routine in the error block (abort, retry and resume also mark process ends in the error block) and causes the process to complete if at the highest macro level or return to the caller if at a sub-level.

Define

This instruction maps the name of the commands (used by the execute instruction in the macro and by command names passed as part of the input data stream) and the component API or another macro. The first parameter is the name described above. The second parameter is the external API or macro and the third parameter is the level. The level indicates the process level within the command tree—it is used in conjunction with the Traverse instructions.

Declare

Declare is used to declare local variables. The first parameter specifies the variable name and the second dictates its type. System variables may be preceded with a '&'. The '&' prefix may indicate that the variable is public and can be passed back to gateway caller. These may be system dependent however the following are common:

| | |
|---|---|
| &0 | Contains the arguments passed via a calling macro's execute instruction |

-continued

| | |
|---|---|
| &1–&n | Contains the tokenised arguments passed via a calling macro's execute instruction. The token is normally a word but may be a phrase delimited by apostrophes |
| &RC | Contains the runtime error code. Passed back to gateway caller if non-zero |
| &MSGNO | This is a queue of runtime error numbers that have occurred |
| &MSGTEXT | This is a queue of runtime error messages associated with the runtime error numbers n &MSGNO. |
| &MQQ | Contains the number of messages in the message queue. |
| &NULL | A null receiver (not used) |

Execute

The Execute instruction calls the command specified as the first parameter. Arguments may be passed in the second and subsequent parameters.

'Execute' may be used to invoke (call) any program in the host operating environment, passing any input and output parameters that are required. At the macro language level, this is platform-independent. Although there will be some platform specifics in the underlying run-time support to enable this to happen on a specific platform, the person writing the macro does not need to know about this.

Traverse

This instruction causes the in-stream macros to be executed. Taking the earlier example the level 1 commands are actually issued from within the macro itself while the levels 2–5 macros are defined in the in-stream. As macro names are encountered in the in-stream a check is made to ensure that the macro names have been defined in one of the loaded macro's header instructions. Assuming this to be the case—the macro and its variables are atomised around the in-stream tree. The hierarchy levels, by which that the macro and variables are attached to the tree, are dictated by the level parameter of the header instruction. The Traverse instruction tells the processor to traverse the tree executing the in-stream macro between the given levels.

If/Else/EndIf

The construct supports block If/Else/Endif Branches.

Commit

The Commit instruction issues a transaction commit. If SQL has been invoked then this will automatically be committed.

Rollback

This instruction issues a transaction rollback in a recovery situation. If SQL has been invoked then this will automatically be rolled-back.

For/While/Until

The For/While/Until constructs define the start of a loop. The second parameter should contain an expression that resolves to a Boolean value. In the case of the While instruction the Boolean value being true will cause the loop to continue and visa-versa for the Until. The While test is done at the top of the loop and, therefore, if the Boolean expression is false the nested loop code will not be executed. In the case of the Until instruction, the Boolean expression is evaluated at the bottom of the loop and therefore the nested code will always execute at least once. In the case of the For instruction, the loop is initialised using the first expression of the Fpr instruction and terminates using the second expression. The loop can increment using an optional Step expression.

OnError and Label

The OnError construct is used to divert error processing to a labelled process within the error block. The first parameter may specify a valid label name or be blank. If a runtime error occurs and there is no valid error handler, the macro will abort. The error label must exist within the macro definition.

Abort/Retry

Following an error, the routines within the error handler may issue any of these instructions. 'Abort' stops the process completely and shuts down the API engine. 'Retry' causes the failing instruction to be called again. 'Resume' causes the process to restart on the instruction following the failing one. 'Exit' causes the process to end in a controlled manner and error information is passed back to the gateway caller.

Following an error, the current error handler label is still active, so further errors will cause re-entry to the label. To avoid this, one may issue an OnError instruction in the error handler to catch any errors that may occur while processing the error. On returning from an error handler the previous error handler will become active. OnError instructions should be carefully controlled as misuse will lead to loops.

Exit

When Exit is issued from normal macro processing (i.e. not in an error handler) the current macro is exited and control is returned to the calling macro.

Built-in Functions

Built-in functions can be called either as part argument list as in the Boolean expressions associated with If, While and Until instructions or as assignments using the Let instruction. These may include the functions substring, concatenation, number conversion routines, number to alpha conversion routines, length measurement, stripping blanks (leading, trailing, and both), value comparison, character search, padding blanks, e-mail notification (for sending a message to a remote processor), spawning commands, and more.

TABLE 1

```
# Macro LEVELTEST-test return from a nested Level.
# Expected output: RESULT = "Hello World"
# In String: LEVELTEST(RET)
# Out String: LEVELTEST(RET;RESULT;"Hello World")

Macro LEVELTEST access=PUBLIC VALIDATE=NO
PARAMETER RESULT Type=String Direction=Out Mandatory=No ""
        # Define all MACRO'S you intend to execute.
        Define RET=RET 2
        Traverse 2 2
        # DEFINE INLINE MACRO FOR SQL RETURN of Statement
Basics-LEVEL 2
        Inline RET Access=Private
                PARAMETER RESULT Type=String Direction=OUT
Mandatory=No ""
                LET RESULT =["Hello World"]
```

Referring to (Tables 1 and 2), there are synthetic examples designed to demonstrate some of the important features of the macro language, including the use of SQL.

Call the encapsulated API

EXECUTE IGI4009ILE"" and

Call the encapsulated API

EXECUTE IGI4011ILE""

which results in the external programs being invoked, allowing interaction between the macro and the API and the internal application.

LEVELTEST and RET are two macros wherein LEVELTEST is the top-level macro whilst RET is at a sub-level.

The DEFINE statement in LEVELTEST determines the correct sublevel. "Define RET=RET 2" means that the macro RET has an alias of RET and is at sublevel 2.

When the input string "LEVELTEST(RET)" is encountered, the input parser creates the LEVELTEST macro as the top macro and RET as a sub-level macro attached to LEVELTEST.

During the execution of LEVELTEST the "TRAVERSE 2 2" statement is encountered. This tells the macro processor to execute all in-context macro at level 2 (strictly all levels between level 2 and level 2 in a tree structured manner).

In this example the traverse statement will cause macro RET to be executed and the return data will be "LEVELTEST(RET;RESULT;"Hello World")".

If the input data was "LEVELTEST(RET)(RET)" then the result would be "LEVELTEST(RET;RESULT;" Hello World")(RET;RESULT;"Hello World")".

By using macro built-in functions (BIFs) it is possible to create sub-level macro on the fly. One of the BIFs allows the macro programmer to create new macros from SQL SELECT statements. In essence each record retrieved from the SQL is attached as a macro (the macro name being specified as a parameter in the BIF).

TABLE 2

Macro LEVELTEST-test return from a nested Level.
Expected output: RESULT "Hello World"
In String: LEVELTEST

Macro LEVELTEST access=PUBLIC VALIDATE=NO
    PARAMETER RESULT Type=String Direction=Out Mandatory=No ""
        # Define all MACRO'S you intend to execute.
        Define RET=RET 2
        Declare RecCount Integer
        Let RecCount = [GETM("RET", "CUSTOMER BalTel BalCATV FROM . . . more sql")]
            Traverse 2 2
            # DEFINE INLINE MACRO FOR SQL RETURN of Statement Basics-LEVEL 2
            Inline RET Access=Private
            PARAMETER CUSTOMER Type=String Direction=OUT Mandatory=No ""
            PARAMETER TotalBalance Type=String Direction=OUT Mandatory=No ""
                LET TotalBalance =[BalTel + BalCATV]

Table 2 illustrates another macro example. In this example, the line "GETM("RET", "CUSTOMER BalTel BalCATV FROM . . . more sql")" calls GETM which creates new macros from the results of an SQL SELECT request. The SQL returns 2 fields: the customer and the record created date in some internal data format.

Suppose that the result of the executing the GETM is 3 records. The Traverse will cause macro RET to be executed 3 times. On each execute, the two balances BalTel and BalCATV are summed and assigned to TotalBalance.

The result of processing is-string "LEVELTEST" could be: "LEVELTEST(RET;CUSTOMER;"BROWN A";TotalBalance;"12.34") (RET;CUSTOMER;"GREEN B"; TotalBalance;"20.20") (RET;CUSTOMER;"SMITH C"; TotalBalance;"1.35")

Should the GETM call have resulted in 300 records then the result string would, of course, have 300 RET's.

A source level debug for the macro processor and a trace facility may be provided for debugging purposes.

I claim:

1. A system for developing intermediate application programming interfaces comprising a processor configured to act as a dispatcher and a processor configured to act as an engine wherein:
    said dispatcher receives an intermediate application programming interface request;
    said dispatcher directs said intermediate application programming interface request to said engine wherein said engine is pre-configured to process said intermediate application programming interface request for a predetermined application;
    said engine allocates an engine thread to process said intermediate application programming interface request and to create an application programming interface descriptor wherein said descriptor comprises a release descriptor, a macro descriptor, and a field descriptor;
    said engine thread matches said intermediate application programming interface request to a macro via said release descriptor, macro descriptor, and field descriptor wherein said macro is coded using a predefined macro language;
    said engine thread prepares a set of commands associated with said macro and passes at least one command from said set of commands to a separate process;
    said process executes said at least one command;
    results associated with said at least one command are passed back to said engine thread; and
    said engine prepares a response to said intermediate application programming interface request, based on said results, and returns said response to said dispatcher.

2. The system for developing intermediate application programming interfaces according to claim 1 wherein said engine thread hierarchically processes said set of commands according to a set of instructions contained in said macro.

3. The system for developing intermediate application programming interfaces according to claim 1 wherein said macro language comprises one or more constructs selected from a group of constructs including macro, define, declare, execute, traverse, if/else/endif, commit, for/until/while, endloop, onerror, label, abort, exit, retry, resume, and rollback.

4. A system for developing intermediate application programming interfaces according to claim 3 wherein said engine is language and platform independent.

5. A system for developing intermediate application programming interfaces comprising a dispatcher and an engine wherein:
    said dispatcher receives an intermediate application programming interface request;
    if said engine is not available, said dispatcher queues said intermediate application programming interface request until said engine is available;
    when said engine is available, said dispatcher directs said intermediate application programming interface request to said engine wherein said engine is pre-configured to process said intermediary application programming interface request for a predetermined application;
    said engine allocates a thread to process said intermediate application programming interface request and to create an application programming interface descriptor wherein said descriptor comprises at least one release descriptor, at least one macro descriptor, and at least one field descriptor;

wherein said release descriptor is associated with at least one of said macro descriptor and further wherein, said macro descriptor is associated with at least one of said field descriptor;

said thread hierarchically processes a plurality of macros derived by matching said release descriptors and said macro descriptors with at least one macro and performing the following steps:
- if a set of variables from a field descriptor associated with the release descriptor and the macro descriptor of said macro is available, said thread hierarchically prepares a series of commands associated with said macro by associating a set of variables described in said field descriptor associated with said release descriptor and said macro descriptor for said macro;
- if a set of variables from a field descriptor associated with the release descriptor and the macro descriptor of said macro is not available, said thread hierarchically transcends said set of macro descriptors until it finds a set of variables that may be associated with said command;
- said thread passes said command and said set of variables associated with said command to a separate process;
- said process executes said command;
- a set of results associated with said command passed back to said thread;
- said thread associates said set of results with said macro; and
- said engine prepares a response to said intermediate application programming interface request and returns said response to said dispatcher.

6. The system for developing intermediate application programming interfaces according to claim 5 wherein said macro is coded using a predefined macro language comprising one or more constructs selected from a group of constructs including macro, define, declare, execute, traverse, if/else/endif, commit, for/until/while, endloop, onerror, label, abort, exit, retry, resume, and rollback.

7. The system for developing intermediate application programming interfaces according to claim 6 wherein said engine is language and platform independent.

* * * * *